(12) United States Patent
Darling et al.

(10) Patent No.: US 8,182,954 B2
(45) Date of Patent: *May 22, 2012

(54) FULL CELLS EVAPORATIVE COOLING AND COMBINED EVAPORATIVE AND SENSIBLE COOLING

(75) Inventors: Robert M. Darling, South Windsor, CT (US); Michael L. Perry, Glastonbury, CT (US)

(73) Assignee: UTC Power Corporation, South Windsor, CT (US)

( * ) Notice: Subject to any disclaimer, the term of this patent is extended or adjusted under 35 U.S.C. 154(b) by 813 days.

This patent is subject to a terminal disclaimer.

(21) Appl. No.: 12/284,904

(22) Filed: Sep. 26, 2008

(65) Prior Publication Data

US 2009/0035616 A1 Feb. 5, 2009

Related U.S. Application Data

(63) Continuation-in-part of application No. 11/230,066, filed on Sep. 19, 2005, now Pat. No. 7,579,098, which is a continuation-in-part of application No. 11/027,332, filed on Dec. 29, 2004, now Pat. No. 7,504,170.

(51) Int. Cl.
*H01M 8/04* (2006.01)

(52) U.S. Cl. .................. 429/434; 429/435; 429/442

(58) Field of Classification Search .................. 429/434, 429/435, 442
See application file for complete search history.

(56) References Cited

U.S. PATENT DOCUMENTS

| 3,704,172 | A | 11/1972 | Stedman et al. |
| 6,790,550 | B2 * | 9/2004 | Imamura et al. ........... 429/442 X |
| 7,579,098 | B2 * | 8/2009 | Reiser et al. ................... 429/429 |

* cited by examiner

*Primary Examiner* — Stephen J. Kalafut
(74) *Attorney, Agent, or Firm* — M. P. Williams

(57) ABSTRACT

Water passageways (67; 78, 85; 78a, 85a) that provide water through reactant gas flow field plates (74, 81) to cool the fuel cells (38) may be grooves (76, 77; 83, 84) or may comprise a plane of porous hydrophilic material (78a, 85a), may be vented to atmosphere (99) by a porous plug (69), or pumped (89, 146) with or without removing any water from the passageways. A condenser (59, 124) receives exhaust of reactant air that evaporatively cools the stack (37), and may have a contiguous reservoir (64, 128), be vertical (a vehicle radiator, FIG. 2), be horizontal across the top of the stack (37, FIG. 5), or below (124) the stack (120). Condenser air flow may be controlled by shutters (155), or by a controlled, freeze-proof heat exchanger (59a). A deionizer (175) may be used. Sensible heat transferred into the water is removed by a heat exchanger 182; a controller (185) controls water flow (180) and temperature as well as air flow to provide predetermined allocation of cooling between evaporative and sensible.

38 Claims, 8 Drawing Sheets

FULL CELLS EVAPORATIVE COOLING AND COMBINED EVAPORATIVE AND SENSIBLE COOLING

CROSS REFERENCE TO RELATED APPLICATION

This is a continuation-in-part of U.S. patent application Ser. No. 11/230,066, filed Sep. 19, 2005, now U.S. Pat. No. 7,579,098, in turn a continuation-in-part of application Ser. No. 11/027,332 filed Dec. 29, 2004, now U.S. Pat. No. 7,504,170.

TECHNICAL FIELD

Fuel cells having water passageways that provide water to reactant gas flow passages wherein the water is evaporated in proportion to the waste heat generated in the cells; the water condensed from the exhausted reactant gas is returned to the water passageways, which may be dead-ended or vented, that receive condensate from a condenser which removes water from the air exhausting the cells. Evaporative cooling is combined with cooling by conduction of sensible heat into coolant water, thereby reducing average temperature of the stack and controlling the temperature profile in the cells.

BACKGROUND ART

It is known in the fuel cell art to evaporatively cool fuel cells, thereby deriving the benefit of the heat of vaporization, in contrast with conveying sensible heat to circulating water passing through the cells or coolant passing through coolant plates. Typically, prior approaches to evaporative cooling have taken one of two forms. In a first form, water is abundantly atomized or fogged into the gas stream of one or both of the reactant gases.

The other form of prior approaches utilizes wicking to bring water into the cells. One recent example is shown in U.S. publication 2004/0170878, which is briefly illustrated in FIG. 1 herein. A fuel cell 11 has strips of wicking 12 disposed over a diffusion layer 13 which is in intimate contact with the cathode catalyst in the membrane electrode assembly (MEA) 14. The fuel cell 11 includes an anode 18, which in the subject publication is not involved with cooling. The fuel cell is separated from the next cell in the series 20 by a separator plate 21. A similar separator plate is present, though not shown, on the top of the fuel cell as seen in FIG. 1.

To provide water to the wicking 12, a wicking header 22 extends across the ends of all of the fuel cells on an end thereof which is opposite to the flow of air into the spaces 24 between the wicking 12 that comprise the oxidant reactant gas flow field. Air is supplied by a pump 26 through a manifold 27 to the inlets 28 of each fuel cell.

In FIG. 1, the air flow is exhausted through an outlet header 31 to a condenser 32 which vents the air to exhaust and delivers the condensate to a reservoir 33. Water in the reservoir 33 is conducted to the wicking header 22.

The wicking evaporative cooling described in the aforementioned publication is stated to require external water, from a source outside the fuel cell power plant, since the water generated at the cathode (process water) is said to be insufficient, except at startup, to achieve the necessary cooling. This is also true in an evaporatively cooled fuel cell stack which relies on wicking in U.S. Pat. No. 4,826,741. Therein, 100 $cm^2$ cells have performance of only 0.7-0.8 v at 100-120 $mA/cm^2$ (108-130 $A/ft^2$). Furthermore, the capillary pressure differential along the length of each of the wicks must be greater than the pressure drop along the adjacent air flow field channels in order for there to be a positive wicking velocity, although it is stated that having air flow in the same direction as the flow of water in the wicking means would overcome that problem.

Thus, evaporative cooled fuel cells that rely on wicking require external water, have limited planform size and the performance thereof is limited by small current density.

In order to transport sufficient water to provide the necessary evaporative cooling, from the wicking header 22, located at the perimeter of the cells, to all areas of the cells requiring cooling, the wicking required is considerable, causing each fuel cell to be thicker than is acceptable within the limited volume which is mandated for use in vehicular applications.

SUMMARY

Disclosed are: fuel cells which are thinner than fuel cells known to the prior art; the use of evaporative cooling in fuel cells in which the supply of water to the fuel cells is controllable independently of the pressure in the air supply; evaporative cooling of fuel cells in which the supply of water to the cells is independent of the supply of reactant gas to the membrane electrode assembly of the fuel cells; evaporatively cooled fuel cells capable of having large area planform and capable of operating with high current densities; fuel cells cooled by evaporation of coolant in reactant flow as well as by transfer of sensible heat into the coolant; evaporatively cooled fuel cells that resist freezing of components when under no load or low load in subfreezing weather; and improved fuel cells for vehicular and other applications.

In one preferred embodiment, fuel cells in a fuel cell power plant are evaporatively cooled by water supplied in minute passageways, which may comprise a material having in-plane (that is, parallel to the gas flow) permeability to water, which are adjacent to or within a first surface of the hydrophilic porous reactant gas flow field plates that have reactant gas flow channels opening at opposite surfaces of the flow field plate. The inlet of each minute passageway is in fluid communication with a water reservoir which receives condensate from the cathode exhaust.

In another embodiment, the water supply to the minute passageways may be further enhanced by means of a vacuum pump. The pump simply provides a correct pressure in the portions of the passageways of the stack to assure that the water level will reach all parts of the passageways in the stack. In some embodiments, water may flow through the passageways to enhance bubble removal and/or to provide flow through a water clean-up system, such as a de-ionizer. However, the invention may also be practiced with the water passageways being dead-ended.

In accordance with another optional embodiment, a fuel cell stack utilizing evaporative cooling with water supplied to the surface of hydrophilic porous reactant gas channel plates, may be operated with fixed air flow, in contrast with a fixed air utilization, the air flow being sufficient to control the maximum stack temperature at moderately high current densities. In further accord with this optional embodiment of the invention, the air flow rate may be controlled in stages, in dependence upon the temperature within the fuel cells.

In the invention, water passes from the aforementioned minute passageways or permeable material through the flow field plate perpendicular to the plane thereof, in contrast with wicking of the prior art, which conducts water in parallel with the plane of the fuel cells. Therefore, the water travels only a very short distance from the minute passageways or permeable material through porous material to the surface of the reactant channels where it evaporates, typically less than 0.5 mm.

The invention allows managing the water for evaporative cooling separately from the pressure drop across the reactant gas flow path into which the water will migrate. The invention allows individual fuel cells to be thinner than those of comparable performance known to the prior art.

The condenser may use uncontrolled ambient air to cool the cathode exhaust, or the amount of air may possibly be controlled in relation to the air exhaust temperature from the stack; in other embodiments, the cathode exhaust may be cooled by heat exchange with another fluid, such as a liquid which is freeze-proof within the expected operating environment, the amount of liquid passing through the heat exchanger being controllable.

In another preferred embodiment, evaporative cooling is combined with transfer of sensible heat, including conduction and convection, by controlling the flow of process air and the temperature and flow of coolant water to achieve a predetermined temperature in the stack, the cooling being both substantially transfer of sensible heat and substantially evaporative.

Other variations will become more apparent in the light of the following detailed description of exemplary embodiments, as illustrated in the accompanying drawings.

MODE(S) OF IMPLEMENTATION

Figure 1:
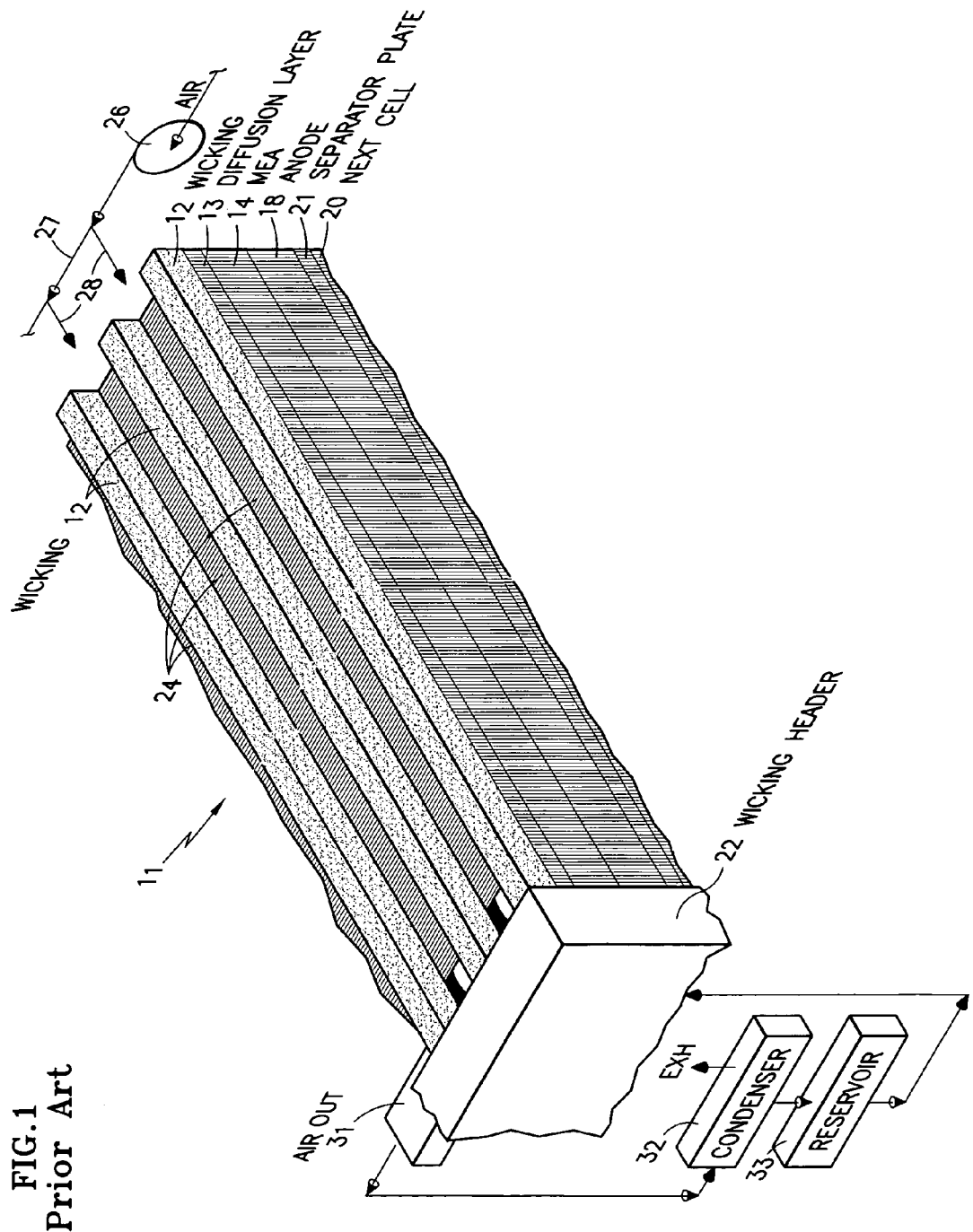
FIG. 1 is a partial, perspective illustration of an evaporatively cooled fuel cell employing wicking known to the prior art.
Figure 2:
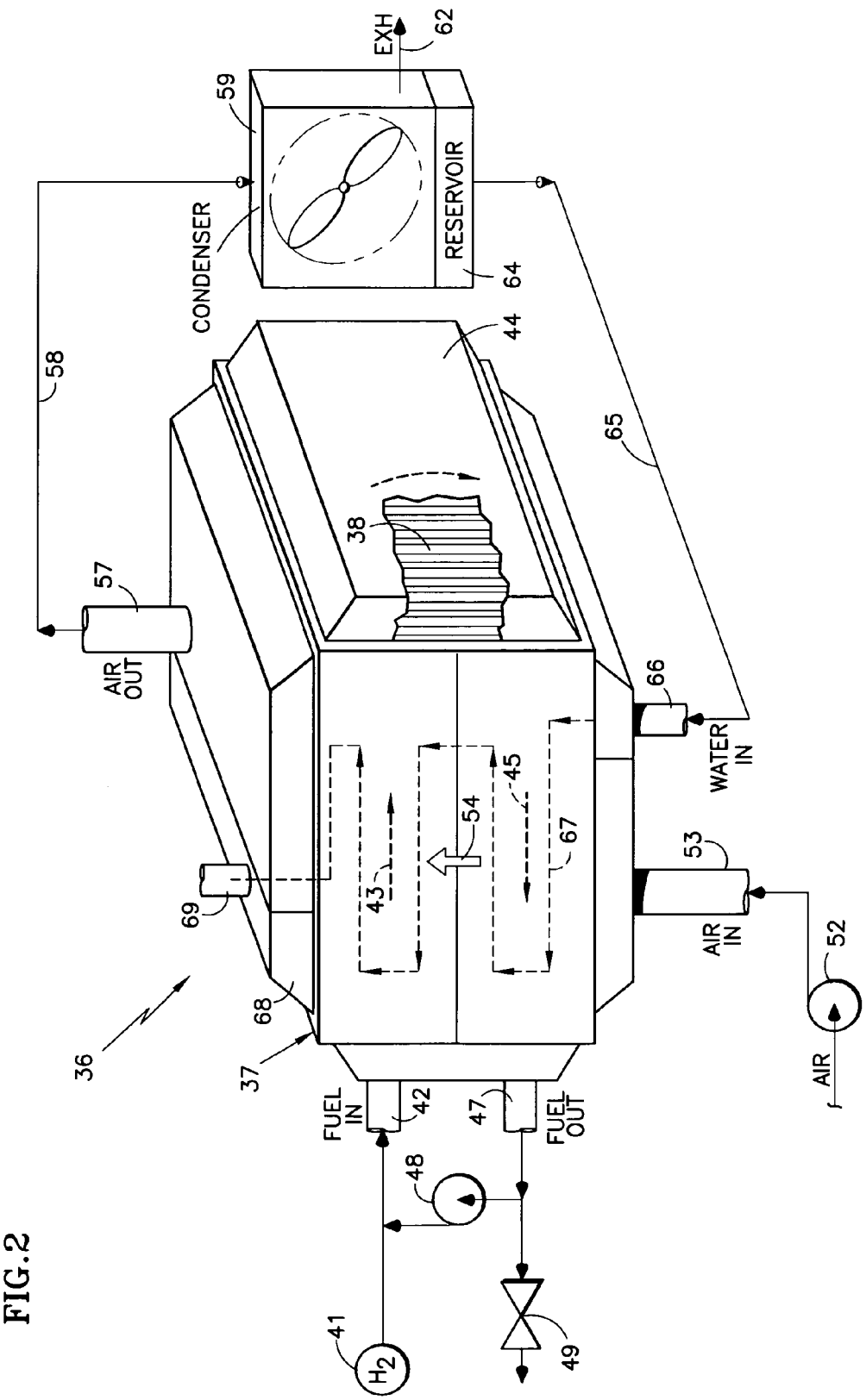
FIG. 2 is a simplified perspective view of a fuel cell power plant employing water transport plates with evaporative cooling.

Referring now to FIG. 2, a fuel cell power plant 36 includes a stack 37 of fuel cells 38 which are shown disposed vertically, although they may be disposed horizontally.

In this embodiment, fuel from the source 41 is provided to a fuel inlet 42 and flows to the right in a first fuel pass, as indicated by the bold arrow 43, to a fuel turn manifold 44. The fuel gas then flows downwardly and into a second fuel pass of the fuel flow fields, wherein the fuel gas flows to the left as indicated by the bold arrow 45. From a fuel outlet 47, the fuel may flow through a recycle pump 48 (perhaps with valves not shown) back to the fuel inlet 42, and may be periodically purged to ambient through a valve 49, all as is known in the art. Single pass, triple pass or other fuel flow configurations may be used.

In the embodiment of FIG. 2, process air is provided by a pump 52 to an air inlet 53, and the air flows upwardly through the oxidant reactant gas flow channels of the fuel cells 38, as indicated by the hollow arrow 54. From a process air outlet 57, the air flows in a conduit 58 to a condenser 59, which in a vehicle may be a conventional radiator. The dry exit air is passed through an exhaust 62. The condensate from the condenser 59 may be conducted (directly or in a conduit 63 shown in FIG. 4) for accumulation in a reservoir 64, which is connected by a water return conduit 65 to a water inlet 66. The water then flows through fluid conduits, typically minute passageways 67, into each of the fuel cells 38; the passageways 67 may terminate in a vent manifold 68, from which removal of gas from the passageways is provided through a vent, such as a porous hydrophobic-plug vent 69; or, when suitable in any given case, the passageways may be dead-ended.

Figure 3:
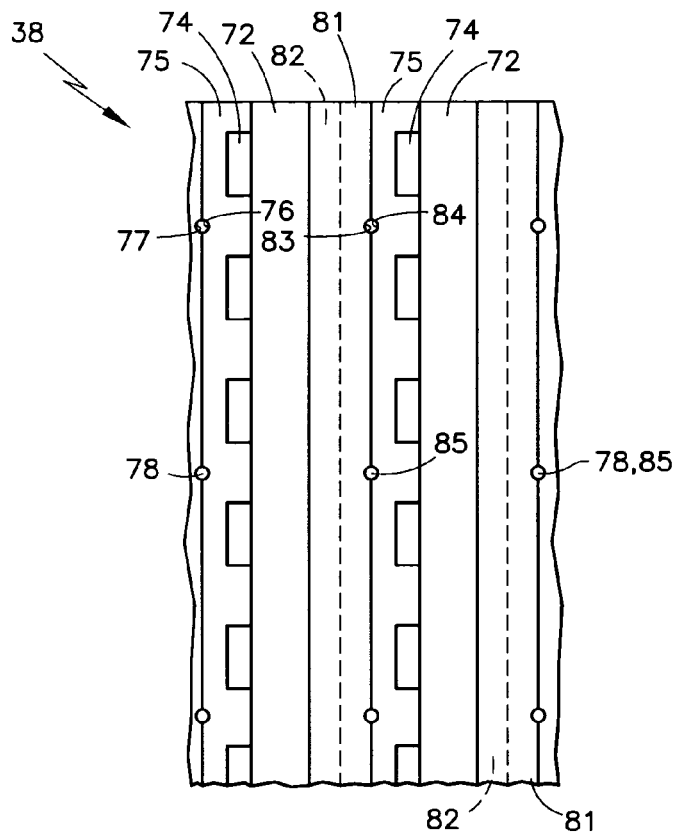
FIG. 3 is a partial, sectioned side elevation view of a pair of fuel cells, with sectioning lines omitted for clarity.

Although there is a water inlet 66, there is no water outlet, the water is simply present in each fuel cell as described more fully with respect to FIG. 3. In FIG. 3, one embodiment of the invention includes fuel cells 38, each of which comprises a conventional membrane electrode assembly 72, which includes an electrolyte with anode and cathode catalysts on opposite sides thereof and may or may not include a gas diffusion layer on one or both electrodes.

In the embodiment of FIG. 3, fuel reactant gas flows through channels 74 in a fuel reactant gas flow field plate 75, which in this embodiment includes grooves 76, which together with grooves 77 of an adjacent fuel cell, form a minute water passageway 78. On the cathode side, an oxidant reactant gas flow field plate 81 includes process air flow channels 82 and grooves 83 which, with grooves 84 on an adjacent fuel cell, together form minute passageways 85.

To prevent flooding, it is preferable that the reactant gases be at least a few Kilopascals (about one-half psi) higher than the pressure of water in the passageways. This will naturally occur as a consequence of the air pump 52 generally causing the air to be that much above atmospheric pressure, and the pressure of the fuel is easily regulated, as is known. In the embodiment of FIG. 2, the water in the conduit 65 is at atmospheric pressure. However, the water could be provided at a pressure other than atmospheric, by a variety of conventional means, provided the reactant gases have a slightly higher pressure as described. If appropriate in any circumstance, the accumulator 64 may be eliminated and the condenser condensate fed directly to the water inlet 66.

In other embodiments, the passageways may be formed other than by matching grooves as shown. Water passageways 67 may be provided in only one of the reactant gas flow field plates 75, 81. The invention may be used in fuel cell stacks having solid separator plates; or if deemed necessary, cooler plates, in which case the coolant flow therein is fully independent of the evaporative cooling of the present invention.

The reactant gas flow field plates 75, 81 appear to be the same as water transport plates, sometimes referred to as fine pore plates, in a fuel cell power plant which utilizes significant water flow through the water transport plates, with external water processing, as is disclosed in U.S. Pat. No. 5,700, 595. However, because there is about a one hundred-to-one improvement in cooling effectiveness per volume of water when evaporative cooling is used, in comparison with the sensible heat water flow cooling of the aforesaid '595 patent, the water flow channels in the prior art have cross sections which are several tens of times larger than the cross sections of the water passageways 78, 85 herein. In addition, the spacing of the lateral portions of the water passageways 78, 85 (shown at each juncture of the fuel cells in the embodiment of FIG. 3) and similar flow passageways in other embodiments, may be separated by a distance which is several times greater than the spacing between lateral portions of water flow channels in sensible heat, water flow cooling systems, as in the aforesaid '595 patent. The small cross section of the water passageways 78, 85, and the large distance between successive lateral portions thereof permit the thickness of the reactant gas flow field plates 75, 81 to be reduced by about one-third.

Figure 4:
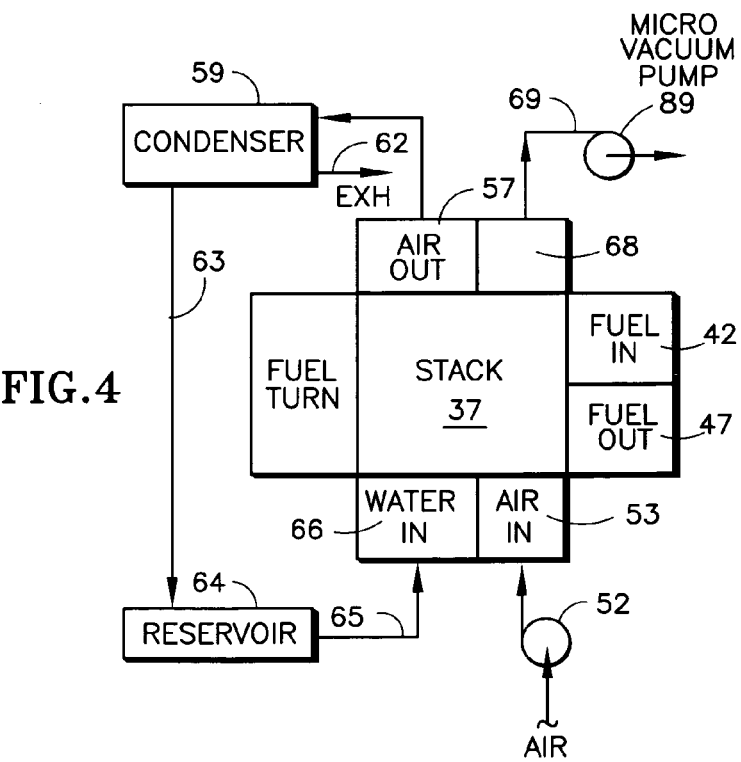
FIG. 4 is a simplified block diagram of a vented embodiment.

Another embodiment is illustrated in FIG. 4. The condenser 59 is connected by a conduit 63 to the reservoir 64. Therein, the vent manifold 68 is connected to a vacuum pump 89, for example the microvacuum type utilized for an aquarium, for the purpose of supplying sufficient vacuum to ensure that the water level reaches the uppermost portions of the passageways in the stack 37. In some embodiments, the pump 89 may not cause any water flow through the vent manifold 68. However, in some embodiments a small flow of water may be necessary to assist gas bubbles to reach the vent and clear the in-stack water passages or bubble blockages. That flow may, for instance, be in the range of about 3%-30% of the mass flow rate of water evaporating into the process air.

Figure 5:
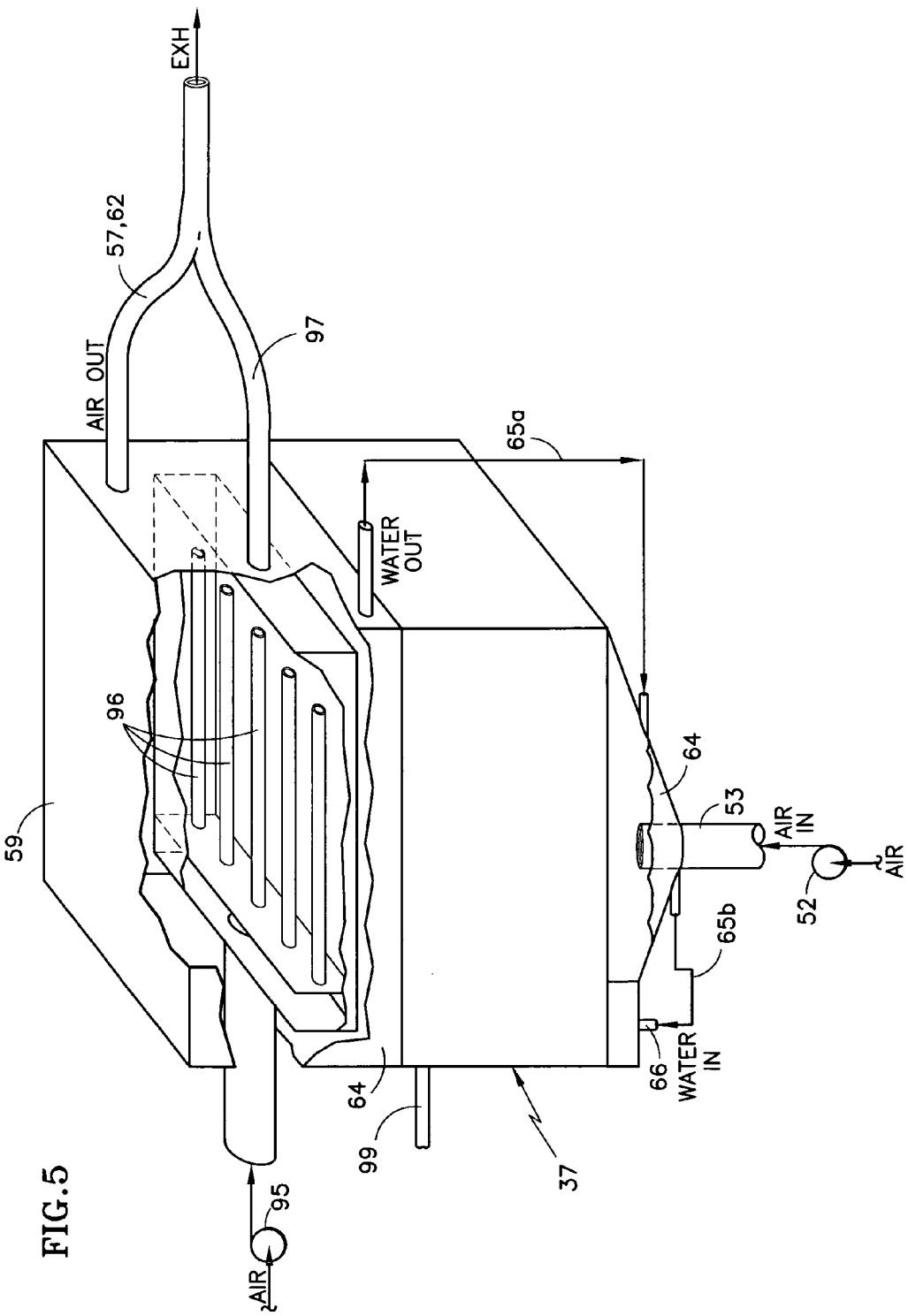
FIG. 5 is a partial illustration of an embodiment of the fuel cell power plant 36 of FIG. 2, in which the air outlet manifold comprises a condenser disposed contiguously with the top of the fuel cell stack.

In FIG. 5, the fuel cell stack has a condenser 59 disposed contiguously across the top thereof, said condenser 59 comprising a reactant air outlet manifold to cool the stack air exhaust. In order to condense entrained water, a blower 95 pumps air through a plurality of cooling tubes 96 which vent through conduit 97 to the cathode exhaust. The condensate is fed through a conduit 65a to a reservoir 64 that comprises a combined accumulator/air inlet manifold, which is connected to the water feed inlet 66 by a conduit 65b. Should the water in the reservoir 64 not provide adequate pressure so that the highest portions of the passageways 67 (FIG. 2) have water therein, then the passageways 67 may be connected to a vent 99 to reference the water pressure to atmospheric pressure; or it may be connected through the vent 99 to a micro vacuum pump 89 (FIG. 4), simply to supply additional pressure differential, as described with respect to FIG. 4 hereinbefore. In FIG. 5, the fuel components have been omitted for clarity. It should be noted that other configurations and cooling fluids could be used in the condenser.

Figure 6:
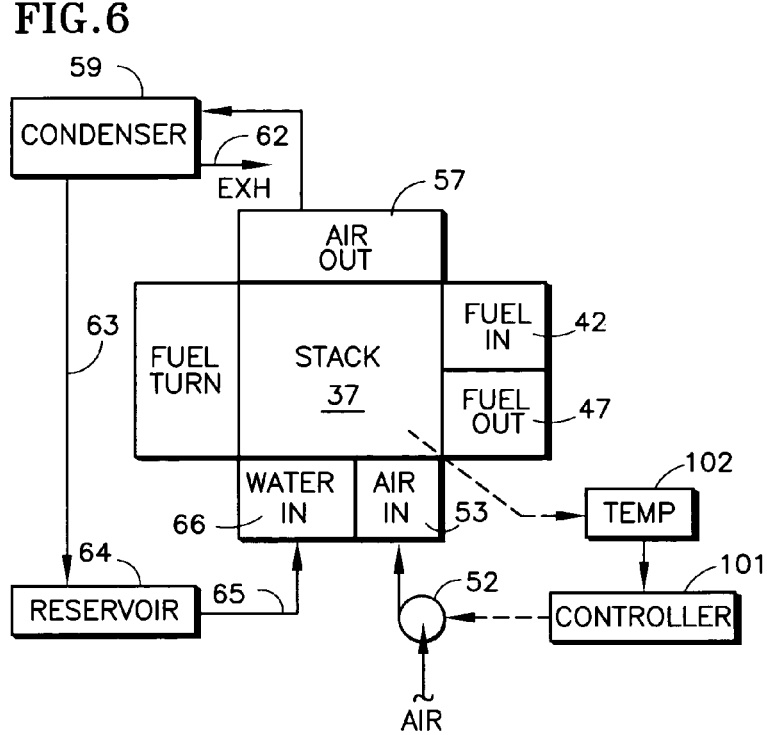
FIG. 6 illustrates controlling air flow as a function of temperature.

In FIG. 6, a controller 101 will regulate the flow of air depending on the temperature 102 of one or more cells of the stack. The control could be continuous or in stages. Or, if desired, the control could simply be to maintain a constant air flow (rather than maintaining constant air utilization) that ensures sufficient evaporative cooling at the stack higher current densities to maintain the desired temperature set point. In this way the average cell temperature will be reduced thus extending stack life.

Figure 7:
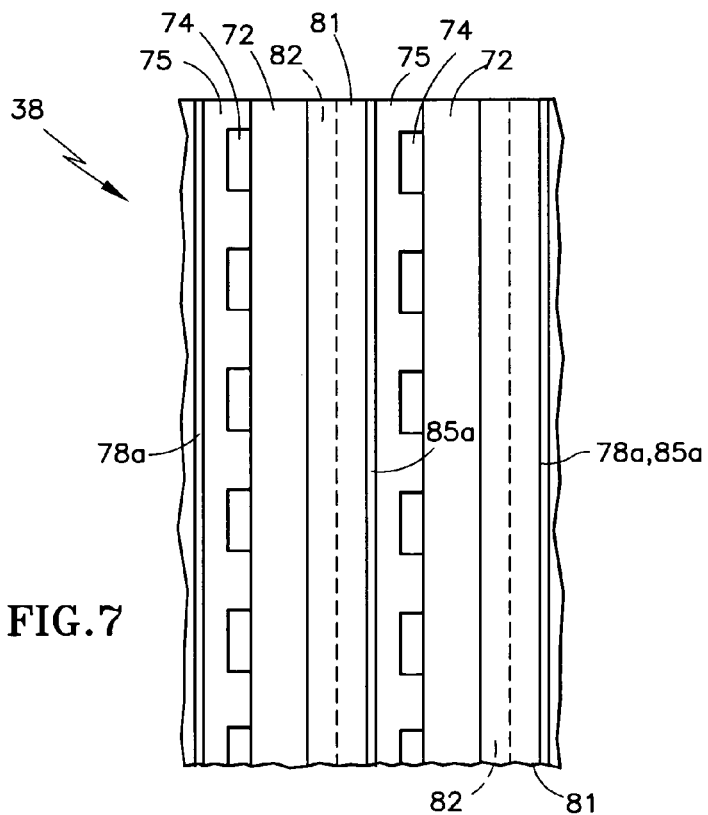
FIG. 7 is a partial, sectioned side elevation view of a pair of fuel cells employing a water permeable plane in the present invention, with sectioning lines omitted for clarity.

FIG. 7 illustrates another embodiment of the invention; in place of grooves forming passageways, there is a material 78a, 85a, which is conductive, hydrophilic and has a high permeability to water, extending over substantially the entire planform of the reactant gas flow field plates 71, 85. Such material may be carbon fiber paper, with fibers aligned in the direction of water motion to help with in-plane water permeability, or it may be other material conventionally used as fuel cell diffusion media. This contrasts with the prior art, as in the aforementioned patent publication, in which the reactant gas flow field plates are impermeable, with spaced-apart strips of water-permeable material defining air flow channels between the strips. In that case, any water pressure will cause flooding. Herein, the pressure (head) of water can be whatever is reasonably necessary to assure replenishment throughout the stack, while the reactant gas pressure can be higher than the water pressure to avoid flooding.

Figure 8:
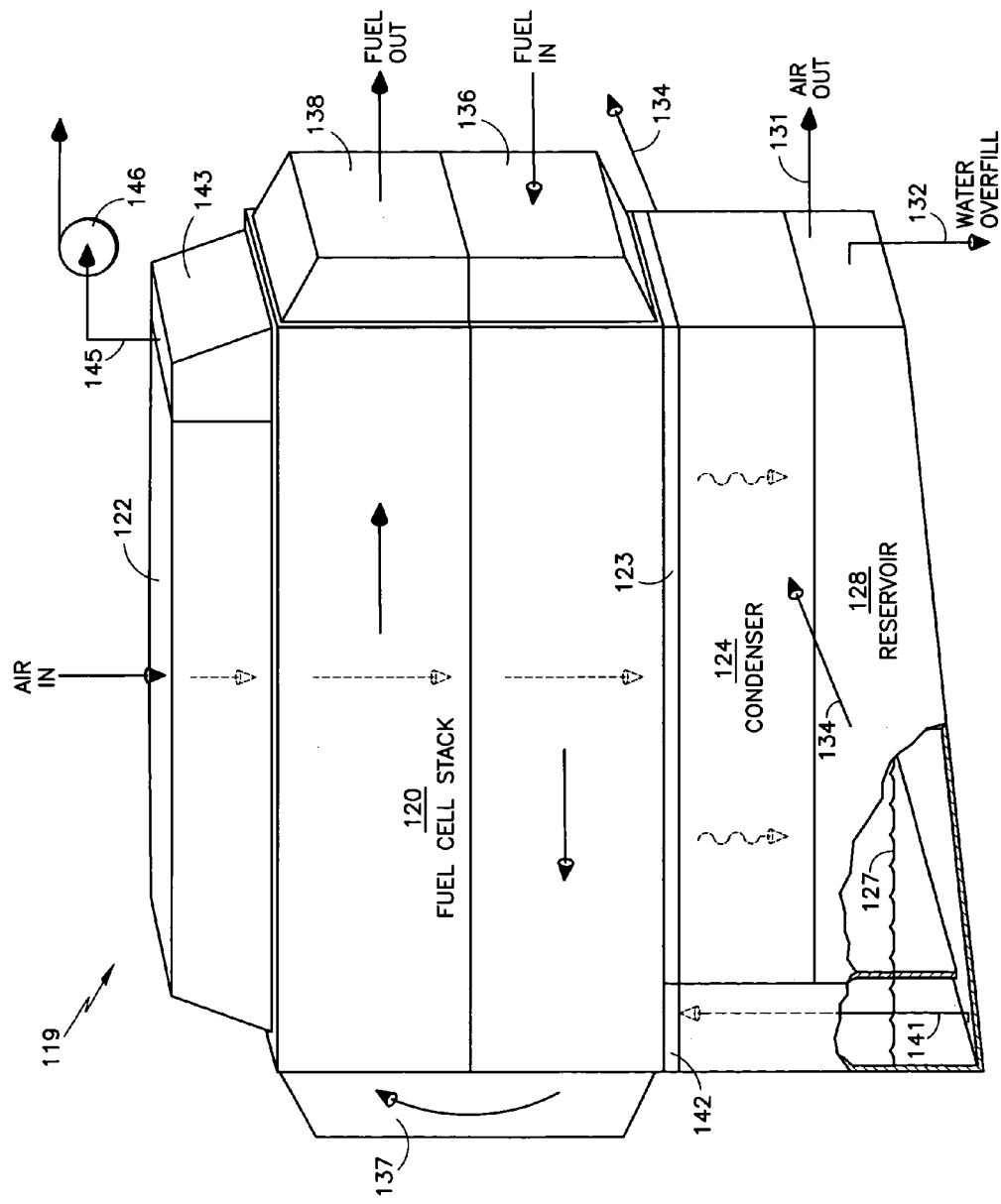
FIG. 8 is a simplified, perspective view of a fuel cell power plant employing another embodiment with downward oxidant reactant gas flow.

FIG. 8 illustrates a portion of a fuel cell power plant 119 having a downflow configuration including a fuel cell stack 120. Air is provided to an air inlet manifold 122 and proceeds through the oxidant flow channels to an air exit manifold 123 and thence into a condenser 124. The outflow from the condenser 124 is above the water line 127 of a reservoir 128. The cooled air is expelled at an air outlet 131, which may also comprise, or otherwise be adjacent to, a water overfill 132. The coolant for the condenser 124 may comprise ambient air as illustrated by arrows 134.

Fuel provided to a fuel inlet manifold 136 flows to the left, then through a fuel turn manifold 137, after which it flows to the right and out through a fuel exit manifold 138.

Water from the reservoir 128 flows through a water conduit 141 to a lower water manifold 142. The water passes into water channels 67 (as described with respect to FIG. 2 hereinbefore) to the top of the fuel cell stack, and possibly into an upper water manifold 143.

The embodiment of FIG. 8 employs evaporative cooling, with no water flowing out of the upper water manifold 143. The only water entering through the lower water manifold 142 is to replace that which is evaporated into the air channels, as described with respect to FIGS. 2 and 3 hereinbefore. A conduit 145 provides a fluid communication to a micro vacuum pump 146, which does not conduct any liquid from the manifold 143, but simply applies sufficient vacuum pressure to ensure that water will rise through all the water channels in the stack. The micro vacuum pump 146 may, for instance, comprise a simple pump of the type used on small aquariums, costing only a few U.S. dollars.

To prevent flooding, it is preferable that the reactant gases be at least a few Kilopascals higher than the pressure of water in the passageways. This will naturally occur during operation of the fuel cell power plant as a consequence of a conventional air pump (not shown) generally causing the air to be that much above atmospheric pressure, and the pressure of the fuel is easily regulated, as is known. In the embodiment of FIG. 8, the water in the channels is at about atmospheric pressure. However, the water could be provided at a pressure other than atmospheric, by a variety of conventional means, provided the reactant gases have a slightly higher pressure as described.

Figure 9:
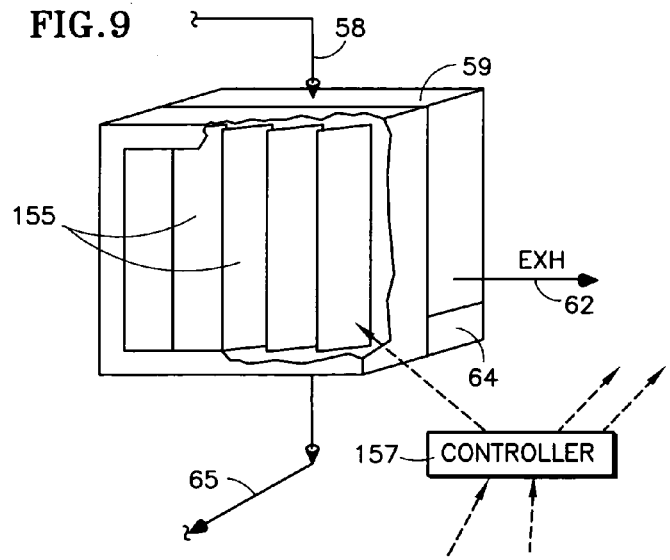
FIG. 9 is a partial, simplified perspective view of an alternative form of external condenser for use with various embodiments.

In accordance with another feature illustrated in FIG. 9, the likelihood of condensate in the reservoir 64 and water in the conduit 65 freezing is reduced in situations where the fuel cell powers an electric vehicle and the condenser is essentially the radiator of the vehicle. When the ambient temperature is below freezing and the load is very low, such as going down a steep hill, the waste heat of the exhaust air can be very low because there is little product water being generated and evaporated, and whatever water is evaporated may actually freeze in the condenser 59, and/or in the conduit 65 that leads back to the fuel cell stack. To avoid this, an air flow controller, for example a plurality of shutters or other air flow control means 155 are disposed at the ambient air inlet side of the condenser 59 and are controlled by a controller 157 so that the air flow through the condenser is reduced under conditions of cold temperatures and low loads. When the load is high, the cathode exhaust in the conduit 58 is warm, so the controller 157 may open the shutters 155, even if the outside air temperature is low. Also, when the outside air temperature is high, the controller 157 may leave the shutters open even if the load is low and the exhaust air in the conduit 58 is cool.

Figure 10:
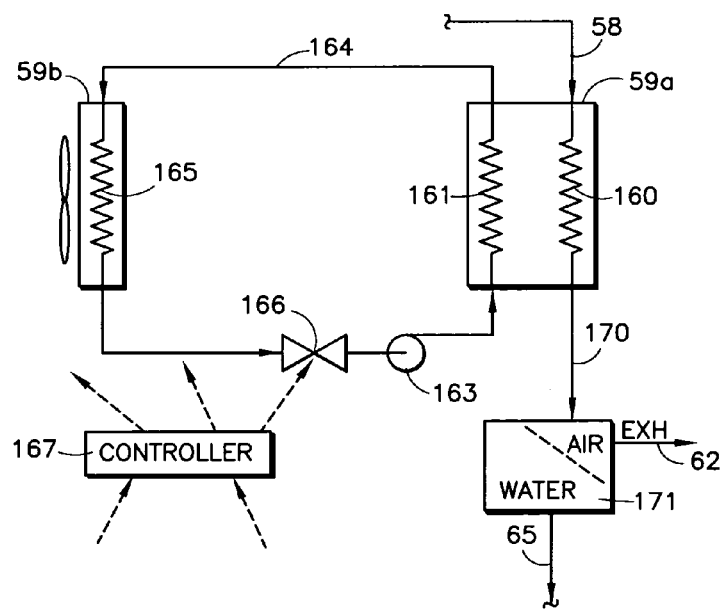
FIG. 10 is a stylized, simplified block diagram of an embodiment employing a secondary heat exchange loop with the condenser.

Another manner of avoiding freezing of the condensate is illustrated in FIG. 10. Therein, a condenser 59a comprises a heat exchanger with one coil (or other conduit) 160 having cathode exhaust air flowing therethrough and the other coil (or conduit) 161 having a fluid, such as a water/glycol mix that will not freeze, flowing therethrough. In this exemplary embodiment, a glycol mix is provided to the coil 161 by a pump 163, which causes flow of the glycol mix through a conduit 164 to an ambient air heat exchanger 59b having a coil (or conduit) 165. Flow from the coil (or conduit) 165 is through a valve 166 that is controllable by a controller 167 so that, when there is a low load in cold temperature, the valve 166 can be closed substantially or entirely, thereby not cooling the cathode exhaust flowing from the conduit 58 through the coil 160. In warm weather or with high loads, the controller 167 can open the valve 166 to provide coolant to the coil (or conduit) 161 thereby cooling the cathode exhaust flowing through the coil (or conduit) 160.

The outflow of the coil (or conduit) 160 is carried by a conduit 170 to an air/water separator 171; the air passing to ambient through exhaust 62 and the water passing back to the fuel cell stack through the conduit 65. Thus, the condenser can have uncontrolled ambient air, controlled ambient air or a fluid such as a freeze-proof liquid to cool the cathode exhaust.

Figure 11:
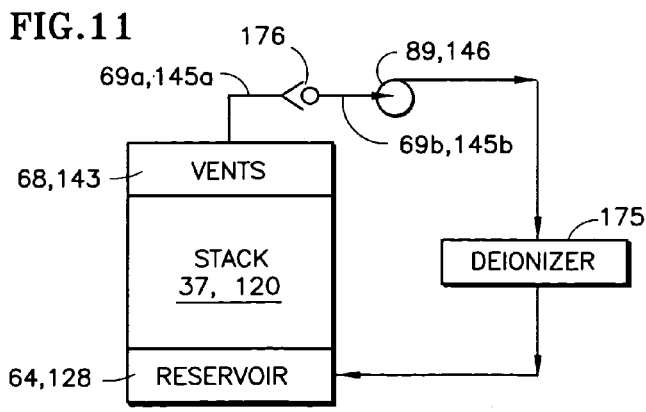
FIG. 11 is a simplified diagrammatic illustration of an embodiment employing a deionizer.

Another embodiment illustrated in FIG. 11 includes a deionizer 175 (sometimes called a "demineralizer") and a check valve 176 are added to those embodiments described hereinbefore which have vents 68, 143 at the top of the stack 37, 120. In those embodiments, the lines 69a, 145a lead to the check valve 176 and the lines 69b, 145b lead from the check valve to the related pump 89, 146. The deionizer 175 is in fluid communication between the pump 89, 146 and the reservoir 64, 128. Thus, some fraction of the water, which may be on the order of about 3%-30% of the mass flow of evaporated water, is drawn from the stack 37, 120 and passed through the cleanup media of the deionizer 175, and then returned to the stack 37, 120 through the reservoir 64, 128. Some of the water flow may bypass the deionizer 175 by controlling a bypass valve around the deionizer 175 as is known in the art. A deionizer may instead be connected, typically with by-pass flow control, to the outlet of the condenser, in some embodiments. It is also possible to maintain the water flow concept without the deionizer if small water circulation is desired for other purposes such as gas removal.

The check valve 176 is optional, and is provided to prevent water which is stored within the channels inside the stack, when the fuel cell power plant is shut down, from "drooping" into the reactant gas flow field channels, through the hydrophilic porous plates (commonly referred to as "water transport plates") within which the water passageways and reactant gas flow field channels are formed.

Water may be drained from passageways and the condenser at shut down in cold climates, if desired. Instead of using the pump 89, 146, the flow through the deionizer 175 can be driven by convection, since the temperature of the deionizer 175 is lower than the temperature of the stack 37, 120. Convection may be enhanced with a heat exchanger in series with the deionizer 175, if desired.

Another preferred embodiment provides both substantial (defined herein as: a large fraction; significant) evaporative cooling, and substantial cooling by transfer of sensible heat into and within circulating coolant water. The embodiment of a fuel cell power plant 36a in FIG. 12 has a water pump 160, a conduit 75a connecting to a heat exchanger 182, which is selectively bypassed through a valve 183, in addition to the condenser 59, the accumulator 64, with its air exhaust 62, and deionizer 175. By virtue of the heat exchanger 182, sensible heat transferred by conduction into and convection within the coolant water can be removed from the water, the temperature of the water leaving the heat exchanger in conduit 185 being established by a controller 187 in order to contribute to the regulation of the amount of heat removed by transfer of sensible heat and the amount of heat removed by evaporation of water into the process air stream. The regulation of cooling in the stack is also controlled in part by the flow rate of air through the cathodes.

Figure 12:
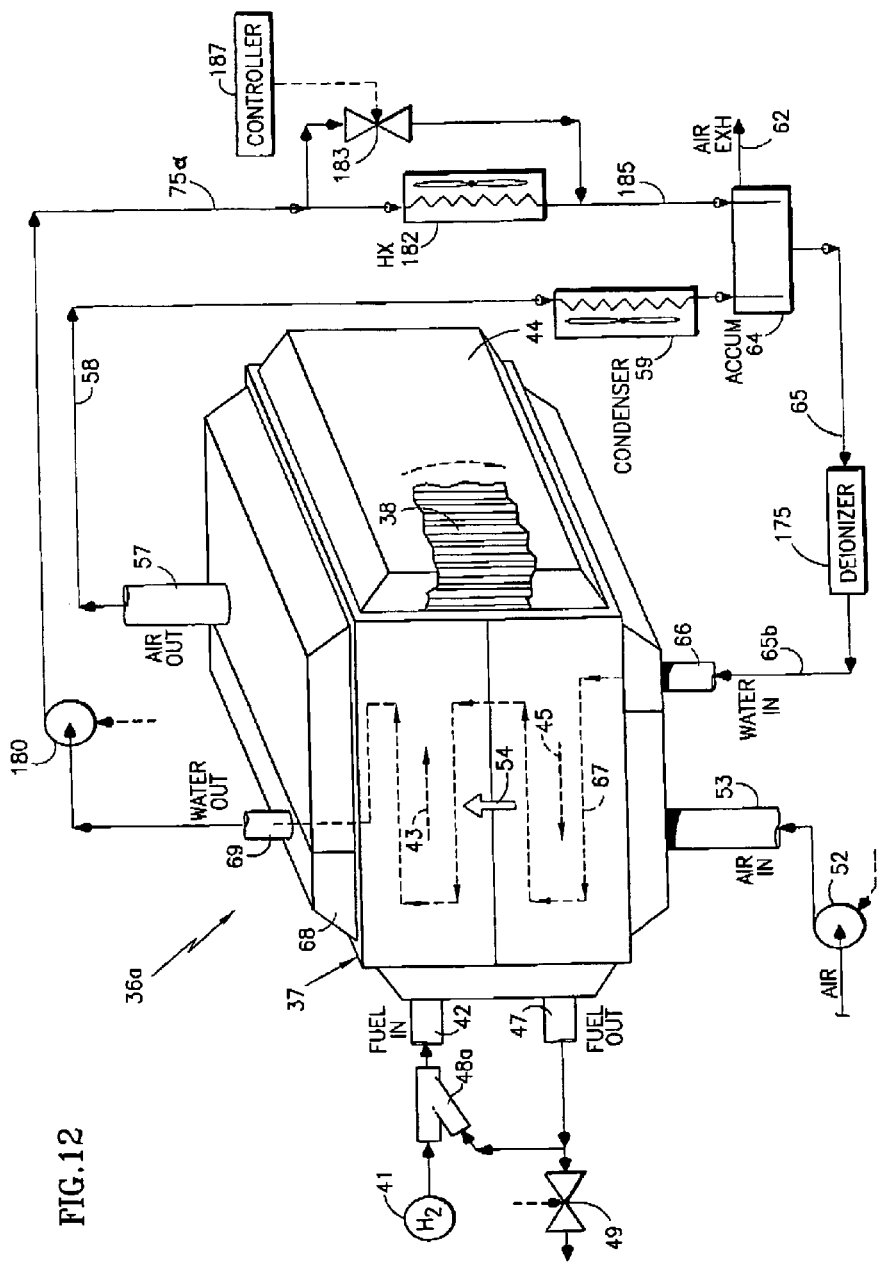
FIG. 12 is a simplified diagrammatic illustration of an embodiment employing both evaporative and sensible cooling.

The condensate of the condenser 59 and water in conduit 185 share the same accumulator in FIG. 12, although that is not necessary. In FIG. 12, the heat exchanger 182 is upstream of the accumulator 64, but other relationships of the apparatus 59, 64, 182, 183 may be utilized where found to be desirable. Generally speaking, the deionizer 175 will normally be most effective if it is at the coolest point of the water stream, that is, just prior to reentry of the water into the conduit 65b, leading to the water inlets 66.

In a combined cooling embodiment, such as the illustrative one in FIG. 12, control over the amount of heat that is removed by evaporative cooling and the amount of heat that is removed by transfer of sensible heat, by conduction into and convection within the cooling water, is achieved in part by controlling the relative pressure between the air flow and the coolant flow (referred to in the aforementioned '595 patent as $\Delta P$), which must be adjusted to cause some of the product water to be transferred through the porous, hydrophilic water transport plates 81 (FIG. 3) into the coolant water channels 78, 85 (FIG. 2), while at the same time allowing a fraction of the product water to be evaporated into the process air stream in the oxidant reactant gas flow field channels 74 (FIG. 3). Because the cooling effectiveness of evaporative cooling per volume of water is about thirty times (or more) greater than the cooling effectiveness by transfer of sensible heat to water, evaporation of only a relatively small portion of the total water flow would be required, for instance, to cause a roughly equal amount of cooling by both processes. In addition, the temperature of the coolant water is regulated (such as by the heat exchanger 59) so that the average temperature across the stack is within a desired range, above the dew point of the air stream in the oxidant reactant gas flow channels 82 (FIG. 3), to provide the desired evaporative cooling. Although air flow can be used to participate in controlling the rate of evaporative cooling, control over air stoichiometry will generally be a more important consideration for air flow.

The advantage of utilizing some proportion of sensible heat cooling is that the temperature of the stack can be lowered, from in the range of between about 75° and about 90° to in the range of between about 60° and about 75°, and adjustment of the relative amounts of conductive and evaporative cooling allows adjustment of temperature profiles across the fuel cell planforms. FIG. 12 also illustrates that the fuel may be recycled through an ejector 48a instead of a pump 48 (FIG. 2).

The aforementioned patent application and '595 patent are incorporated herein by reference.

Thus, although exemplary embodiments have been shown, it should be understood by those skilled in the art that the foregoing and various other changes, omissions and additions may be made therein and thereto, with departing from the spirit and scope thereof.

The invention claimed is:

1. A fuel cell power plant (36) comprising:
   a stack (37, 120) of fuel cells, each fuel cell including an electrode assembly (72) having an electrolyte with cathode and anode catalyst layers disposed on opposite sides thereof, a fuel reactant gas flow field plate (75) having fuel reactant gas flow channels (74) extending from a first surface thereof adjacent said anode catalyst layer, with or without another layer between said anode catalyst layer and said fuel flow channels, an oxidant reactant gas flow field plate (81) having oxidant reactant gas flow channels (82) extending from a first surface thereof adjacent said cathode catalyst layer, with or without another layer between said cathode catalyst layer and said oxidant flow channels, at least one of said flow field plates being porous and hydrophilic with at least one water passageway (67; 78, 85; 78*a*, 85*a*) disposed on or near a second surface of said at least one flow field plate which is opposite to said first surface thereof;

characterized by:

said at least one water passageway either being (a) dead-ended within the corresponding fuel cell or (b) vented (69, 89, 99, 145), said water passageway consisting of either (c) at least one fluid conduit (78, 85) in or adjacent to said at least one plate or (d) a material (78*a*, 85*a*) contiguous with substantially all of said second surface, said material being conductive, hydrophilic and permeable to water; and said fuel cell power plant further comprising:

a condenser (59, 124) connected to a reactant gas exit said of at least one of said reactant gas flow field plates of at least one of said fuel cells, the condensate of said condenser in fluid communication with inlets of the at least one water passageway of said fuel cells, whereby water migrates from each of said at least one water passageway through each of said at least one porous, hydrophilic flow field plates and is evaporated to cool said fuel cells.

2. A fuel cell power plant (36) according to claim 1 further characterized in that:

each fuel cell has a groove (76, 77; 83, 84) in said first surface of either or both said fuel reactant gas flow field plate (75) and said oxidant reactant gas flow field plate (81), which form said water passageways (78, 85) when the fuel cell stack is assembled.

3. A fuel cell power plant (36) according to claim 1 further characterized in that:

said condenser (59) is disposed separately (FIG. 2) from said fuel cell stack.

4. A fuel cell power plant (36) according to claim 1 further characterized in that:

the air flow in said condenser (59, 124) is vertical.

5. A fuel cell power plant (36) according to claim 1 disposed in a vehicle wherein:

said condenser (59) comprises a vehicle radiator (FIG. 2).

6. A fuel cell power plant (36) according to claim 5 further characterized in that:

said condenser (59, 124) has a water reservoir (64, 128) disposed contiguously at the bottom thereof.

7. A fuel cell power plant (36) according to claim 1, further comprising:

a water reservoir (64, 128) receiving said condensate, inlets of said passageways (67; 78, 85; 78*a*, 85*a*) in fluid communication with said reservoir.

8. A fuel cell power plant (36) according to claim 1 further characterized in that:

said at least one water passageway (67; 78, 85; 78*a*, 85*a*) of each fuel cell are each connected to a vent (69, 89, 99, 145).

9. A fuel cell power plant (36) according to claim 8 further characterized in that:

said vent (69, 99) is at atmospheric pressure.

10. A fuel cell power plant (36) according to claim 8 further characterized in that:

the water pressure at said vent (69, 86, 99, 145) is less than or equal to the water pressure at the condenser (59, 124) exit.

11. A fuel cell power plant (36) according to claim 10 further characterized in that:

the water pressure at said vent (69, 86, 99, 145) is less than the water pressure at the condenser (59, 124) exit; and the liquid pressure difference is achieved by pressure of the condenser exhaust gas which pushes water into the water passageways (67; 78, 85; 78*a*, 85*a*).

12. A fuel cell power plant (36) according to claim 10, further comprising:

a water reservoir (64, 128) receiving said condensate, said passageways in fluid communication with said reservoir (64, 128); and further characterized in that:

hydraulic pressure of the water in the condenser (59, 124) pushes water into the water passageways (67; 78, 85; 78*a*, 85*a*).

13. A fuel cell power plant (36) according to claim 10 further characterized in that:

the liquid pressure at said vent (69, 89, 99, 145) is sufficiently less than the water pressure at the condenser exit (59, 124) to provide a flow of water out of the vent.

14. A fuel cell power plant (36) according to claim 13 further characterized by:

a demineralizer (175) receiving a flow of water out of the vent (69, 99, 145), water flowing out of said demineralizer being returned to the proximal ends of said passageways with said condensate.

15. A fuel cell power plant (36) according to claim 14 further characterized by:

a check valve (176) disposed in fluid communication between said passageways and said demineralizer to permit water to flow from said vent only toward said demineralizer.

16. A fuel cell power plant (36) according to claim 8 further comprising:

a vacuum pump (89, 146) connected to said vent and operated in a manner to ensure coolant level reaches all portions of said water passageways (67; 78, 85; 78*a*, 85*a*).

17. A fuel cell power plant (36) according to claim 8 further comprising:

a vacuum pump (89, 146) connected to said vent and operated in a manner to ensure coolant level reaches all portions of said water passageways (67; 78, 85; 78*a*, 85*a*) without creating flow of water through said vent (69, 89, 99, 145).

18. A fuel cell power plant (36) according to claim 8 further comprising:

a vacuum pump (89, 146) connected to said vent and operated in a manner to ensure coolant level reaches all portions of said water passageways (67; 78, 85; 78*a*, 85*a*) and providing flow of water through said vent (69, 89, 99, 145).

19. A fuel cell power plant (36) according to claim 18 further characterized by:

a deionizer receiving a flow of water out of the vent, water flowing out of said demineralizer being returned to said passageways.

20. A fuel cell power plant (36) according to claim 1 further characterized in that:

said condenser (59, FIG. 5) is contiguous with and covers the top of said stack (37).

21. A fuel cell power plant (36) according to claim 1 further characterized in that:

said condenser (59, FIG. 5) is below said stack (120).

22. A fuel cell power plant (36) according to claim 21 further characterized in that:

said condenser (124) is contiguous with the bottom of said stack (120).

23. A fuel cell power plant (36) according to claim 1 further characterized in that:

said stack (37) of fuel cells includes an air inlet manifold (64), the condensate of said condenser (59) being in fluid communication (65*a*) with said air inlet manifold, whereby said air inlet manifold serves as a reservoir, inlets of said at least one water passageway (67; 78, 85; 78*a*, 85*a*) being in fluid communication (65*b*) with the water in said reservoir.

24. A fuel cell power plant (36) according to claim 1 further characterized in that:
water evaporates into the air flowing in said oxidant reactant gas flow channels and the air flow in said channels is held constant (101, 52) at all power levels.

25. A fuel cell power plant (36) according to claim 1 further characterized in that:
water evaporates into the air flowing in said oxidant reactant gas channels and the air flow in said channels is controlled (101, 52) as a function of cell temperature (102).

26. A fuel cell power plant (36) according to claim 1 further characterized in that:
said condenser is selected from (e) a heat exchanger (59) cooled by an uncontrolled flow of ambient air, (f) a heat exchanger (59) cooled by controlled (155, 157) flow of ambient air, and (g) a heat exchanger (59*a*) cooled (161) by a fluid other than ambient air.

27. A fuel cell power plant (36) according to claim 26 further characterized in that:
said condenser is a heat exchanger (59) cooled by ambient air having an air flow controller (155, 157) to control the flow of ambient air therethrough.

28. A fuel cell power plant (36) according to claim 27 further characterized in that:
said air flow controller (155, 157) comprises shutters (155).

29. A fuel cell power plant (36) according to claim 26 further characterized in that:
said condenser is a heat exchanger (59*a*) cooled (161) by a freeze-proof liquid coolant.

30. A fuel cell power plant (36) according to claim 29 further characterized in that:
the amount of said liquid coolant flowing through said condenser is controlled (166) by a controller (167).

31. A fuel cell power plant (36) according to claim 29 further characterized in that:
said liquid coolant is cooled by ambient air in another heat exchanger (165).

32. A fuel cell power plant (36*a*) according to claim 1 further characterized in that said stack is sensibly cooled in addition to being evaporatively cooled, said power plant further characterized by:
said at least one water passageway (67; 78, 85; 78*a*, 85*a*) of each fuel cell are each connected to a vent (69, 89, 99, 145);
a controller (185);
a controllable pump (180) disposed between said vent and inlets (66) of said water passageways;
a controllable heat exchanger (182), disposed between said vent and said inlets of said water passageways, said controller configured to cause said heat exchanger to cool water passing therethrough to a predetermined first temperature; and wherein
said controller is configured to cause said pump and heat exchanger to provide sufficient water through said water passageways at temperatures at or above said first temperature to selectively provide a combination of a first substantial amount of cooling by transfer of sensible heat into coolant water and a second substantial amount of evaporative cooling of coolant water into the reactant gas flow channels of said at least one porous and hydrophilic flow field plates.

33. A fuel cell power plant according to claim 32 further characterized in that said controller is configured to provide between 20% and 80% of the cooling of said fuel cell stack by transfer of sensible heat and to maintain the temperature of said stack, when said fuel cell power plant is in normal operation, between second and third predetermined temperatures, both higher than said first temperature.

34. A fuel cell power plant according to claim 32 further characterized in that said controller is configured to provide between 20% and 80% of the cooling of said fuel cell stack by evaporation and to maintain the temperature of said stack, when said fuel cell power plant is in normal operation, between second and third predetermined temperatures, both higher than said first temperature.

35. A method of operating a fuel cell power plant having a stack (37, 120) of fuel cells, each fuel cell including an electrode assembly (72) having an electrolyte with cathode and anode catalyst layers disposed on opposite sides thereof, a fuel reactant gas flow field plate (75) having fuel reactant gas flow channels (74) extending from a first surface thereof, an oxidant reactant gas flow field plate (81) having oxidant reactant gas flow channels (82) extending from a first surface thereof, at least one of said flow field plates being porous and hydrophilic, with at least one water passageway (67; 78, 85; 78*a*, 85*a*) disposed on or near a second surface of said at least one flow field plate which is opposite to said first surface thereof;
exits of said water passageways connected to external water handling apparatus including (a) a water accumulator, (b) a heat exchanger configured to cool water flowing out of said passageways, and (c) a water pump configured to move water through said heat exchanger and said accumulator to inlets of said water passageways;
said power plant further including a condenser, connected to exits of said oxidant reactant gas flow channels, the condensate of said condenser collecting in said accumulator, said method comprising:
controlling the temperature and the volume of water provided to inlets of said water passageways by said pump to cool said stack by a combination of a first substantial amount of cooling by transfer of sensible heat and a second substantial amount of evaporative cooling.

36. A method characterized by:
providing, to a proton exchange membrane fuel cell stack in which each fuel cell has at least one porous, hydrophilic water transport plate with air and fuel gas flow field channels, respectively, on one side and with at least one coolant passageway on an opposite side of one or both water transport plates, sufficient water to the coolant channels at a temperature to provide (a) substantial cooling of the stack by transfer of sensible heat to the coolant, and (b) substantial cooling of the stack by evaporation of coolant into the air flow field channels.

37. A method according to claim 36 further characterized in that:
evaporation of coolant provides between 20% and 80% of the cooling and convection of sensible heat provides between 80% and 20% of the cooling.

38. A method according to claim 36 further characterized by:
controlling the pressure and amount of air flowing through said air flow field channels to provide a predetermined amount of evaporative cooling.

* * * * *